United States Patent
Kurita et al.

(10) Patent No.: US 12,296,685 B2
(45) Date of Patent: May 13, 2025

(54) HYBRID SYSTEM

(71) Applicant: NISSAN MOTOR CO., LTD., Yokohama (JP)

(72) Inventors: Takashi Kurita, Kanagawa (JP); Daisuke Asakura, Kanagawa (JP); Ryo Watanabe, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 314 days.

(21) Appl. No.: 17/797,286

(22) PCT Filed: Feb. 4, 2020

(86) PCT No.: PCT/JP2020/004175
§ 371 (c)(1),
(2) Date: Aug. 3, 2022

(87) PCT Pub. No.: WO2021/156947
PCT Pub. Date: Aug. 12, 2021

(65) Prior Publication Data
US 2023/0049067 A1    Feb. 16, 2023

(51) Int. Cl.
*B60K 6/40* (2007.10)
*B60K 6/24* (2007.10)
(Continued)

(52) U.S. Cl.
CPC ............... *B60K 6/40* (2013.01); *B60K 6/24* (2013.01); *B60K 6/26* (2013.01); *B60R 16/0207* (2013.01); *B60Y 2200/92* (2013.01)

(58) Field of Classification Search
CPC ... B60K 6/40; B60K 6/24; B60K 6/26; B60K 5/00; B60K 6/46; B60R 16/0207; B60Y 2200/92; Y02T 10/62
See application file for complete search history.

(56) References Cited

U.S. PATENT DOCUMENTS

| 9,724,993 B2 * | 8/2017 | Nakamura | B60K 5/12 |
| 11,383,592 B2 * | 7/2022 | Kodama | B60K 6/46 |

(Continued)

FOREIGN PATENT DOCUMENTS

| JP | S59-158740 U | 10/1984 | |
| JP | 2000152470 A * | 5/2000 | B60K 6/40 |

(Continued)

OTHER PUBLICATIONS

WO-2020240804-A1 English Translation (Year: 2020).*

(Continued)

*Primary Examiner* — James A Shriver, II
*Assistant Examiner* — Michael T. Walsh
(74) *Attorney, Agent, or Firm* — Foley & Lardner LLP

(57) ABSTRACT

A hybrid system for a vehicle includes a drive unit provided with a motor for driving wheels and a power generation unit provided with an engine and a generator driven by the engine. The power generation unit is provided so as to be adjacent to the drive unit in a separated state. One of the drive unit and the power generation unit is mounted on a vehicle body via a first mount member at a lower portion of the one unit. The other one of the drive unit and the power generation unit is mounted on the vehicle body via a second mount member at an upper portion of the other one unit.

8 Claims, 5 Drawing Sheets

(51) Int. Cl.
*B60K 6/26* (2007.10)
*B60R 16/02* (2006.01)

(56) References Cited

U.S. PATENT DOCUMENTS

| | | | |
|---|---|---|---|
| 2013/0264132 A1 * | 10/2013 | Fujiwara | B60K 6/40 180/65.245 |
| 2016/0137052 A1 | 5/2016 | Nakamura et al. | |
| 2019/0184975 A1 | 6/2019 | Kondo et al. | |
| 2022/0033027 A1 * | 2/2022 | Kaneko | B62K 11/04 |

FOREIGN PATENT DOCUMENTS

| | | | | |
|---|---|---|---|---|
| JP | 2013-212815 A | | 10/2013 | |
| JP | 2015214218 A | * | 12/2015 | |
| JP | 2016074429 A | * | 5/2016 | B60K 6/40 |
| JP | 2016-145017 A | | 8/2016 | |
| WO | WO-2012091175 A1 | * | 7/2012 | B60R 16/0215 |
| WO | WO-2015/008581 A1 | | 1/2015 | |
| WO | WO-2018/047224 A1 | | 3/2018 | |
| WO | WO-2020240804 A1 | * | 12/2020 | B60K 6/40 |

OTHER PUBLICATIONS

JP-2016074429-A English Translation (Year: 2016).*
JP-2015214218-A English Translation (Year: 2015).*
WO-2012091175-A1 English Translation (Year: 2012).*
JP-2000152470-A English Translation (Year: 2000).*

* cited by examiner

HYBRID SYSTEM

TECHNICAL FIELD

The present invention relates to a hybrid system used in a vehicle.

BACKGROUND ART

As an example of a system used in a hybrid vehicle, WO2018/047224 discloses a hybrid system including both a drive unit equipped with a drive motor and a power generation unit equipped with a power generation engine and a generator.

SUMMARY OF INVENTION

In the technique disclosed in WO2018/047224, a gear train on the drive unit side and a gear train on the power generation unit side are integrally configured. However, in such a configuration, since a housing becomes large, for example, when an abnormal noise such as a rattling noise is generated in the gear train due to vibration of the engine of the power generation unit or the like, the abnormal noise may propagate to an outside of the housing after resonating on a wall surface of the housing or the like.

Therefore, miniaturization of the housing of the hybrid system is studied. For example, by mounting the drive unit and the power generation unit separately on a vehicle body, it is possible to miniaturize each housing and reduce an overall installation space. Further, by miniaturizing the wall surface of each housing of the drive unit and the power generation unit, the abnormal noise propagating from the wall surface is reduced, so that it is possible to reduce the abnormal noise propagating to the outside of the housing.

However, when the drive unit and the power generation unit are mounted separately on the vehicle body, since a vibration pattern is different between the drive unit driven by the motor and the power generation unit operated by the engine, the drive unit and the power generation unit may swing in a direction approaching each other. Therefore, in order to prevent the drive unit and the power generation unit from coming into contact with each other, it is necessary to increase a separation distance between the two, and thus the installation space of the hybrid system may increase.

According to an aspect of the present invention, a hybrid system installed in a vehicle includes a drive unit provided with a motor for driving wheels and a power generation unit provided with an engine and a generator driven by the engine. The power generation unit is provided so as to be adjacent to the drive unit in a separated state. One of the drive unit and the power generation unit is mounted on a vehicle body via a first mount member at a lower portion of the one unit. The other one of the drive unit and the power generation unit is mounted on the vehicle body via a second mount member at an upper portion of the other one unit.

According to a hybrid system of one aspect of the present invention, one of the drive unit and the power generation unit is mounted on the vehicle body at a lower portion, and the other one is mounted on the vehicle body at an upper portion. In this way, a layout of the hybrid system can be designed considering only the swing of one or the other unit in the upper portion or the lower portion. Therefore, a separation width between the drive unit and the power generation unit can be made shorter, and thus the installation space of the hybrid system can be reduced.

DESCRIPTION OF EMBODIMENTS

Hereinafter, an embodiment of the present invention will be described with reference to the drawings.

Figure 1:
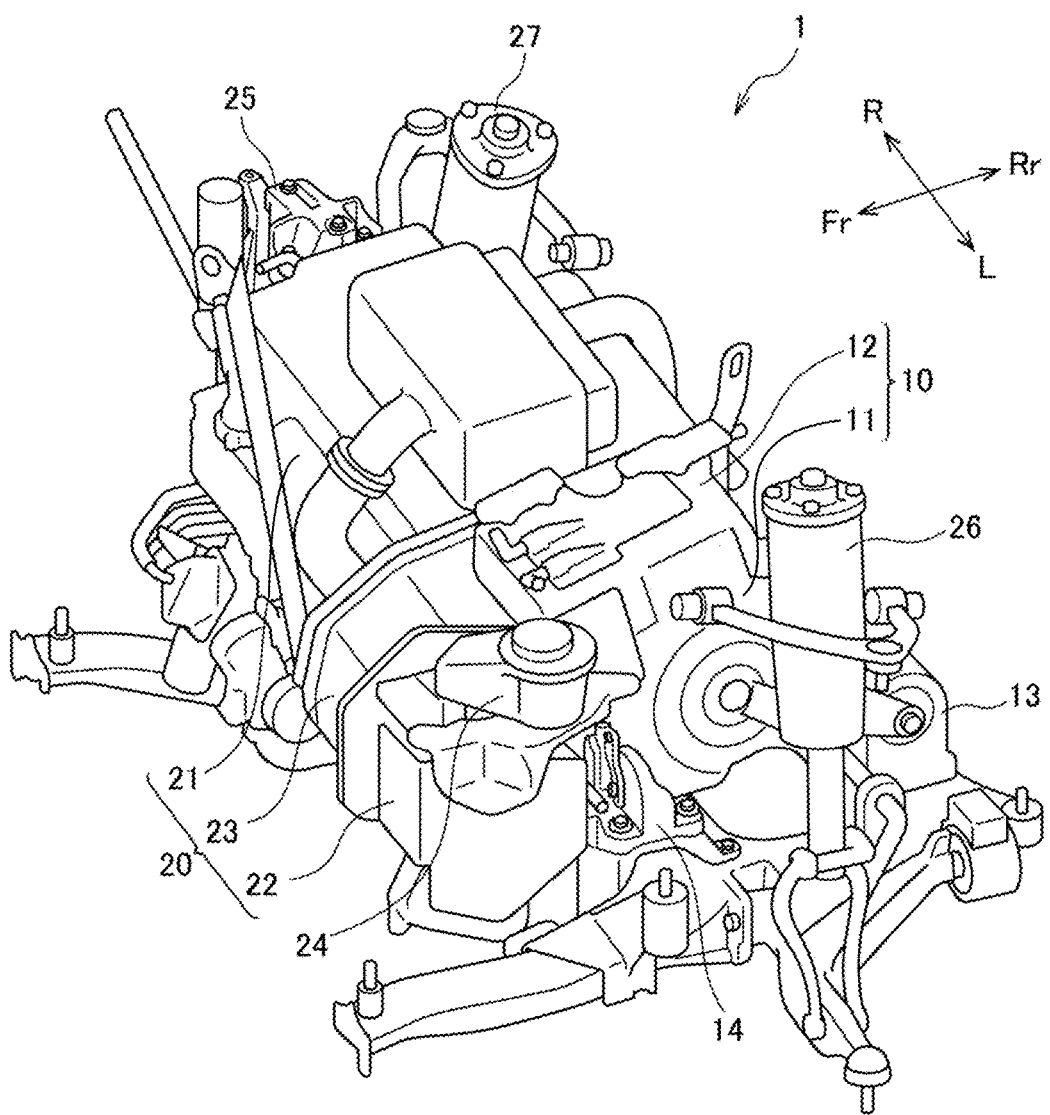
FIG. 1 is a perspective view of a hybrid system of the present embodiment.
Figure 2:
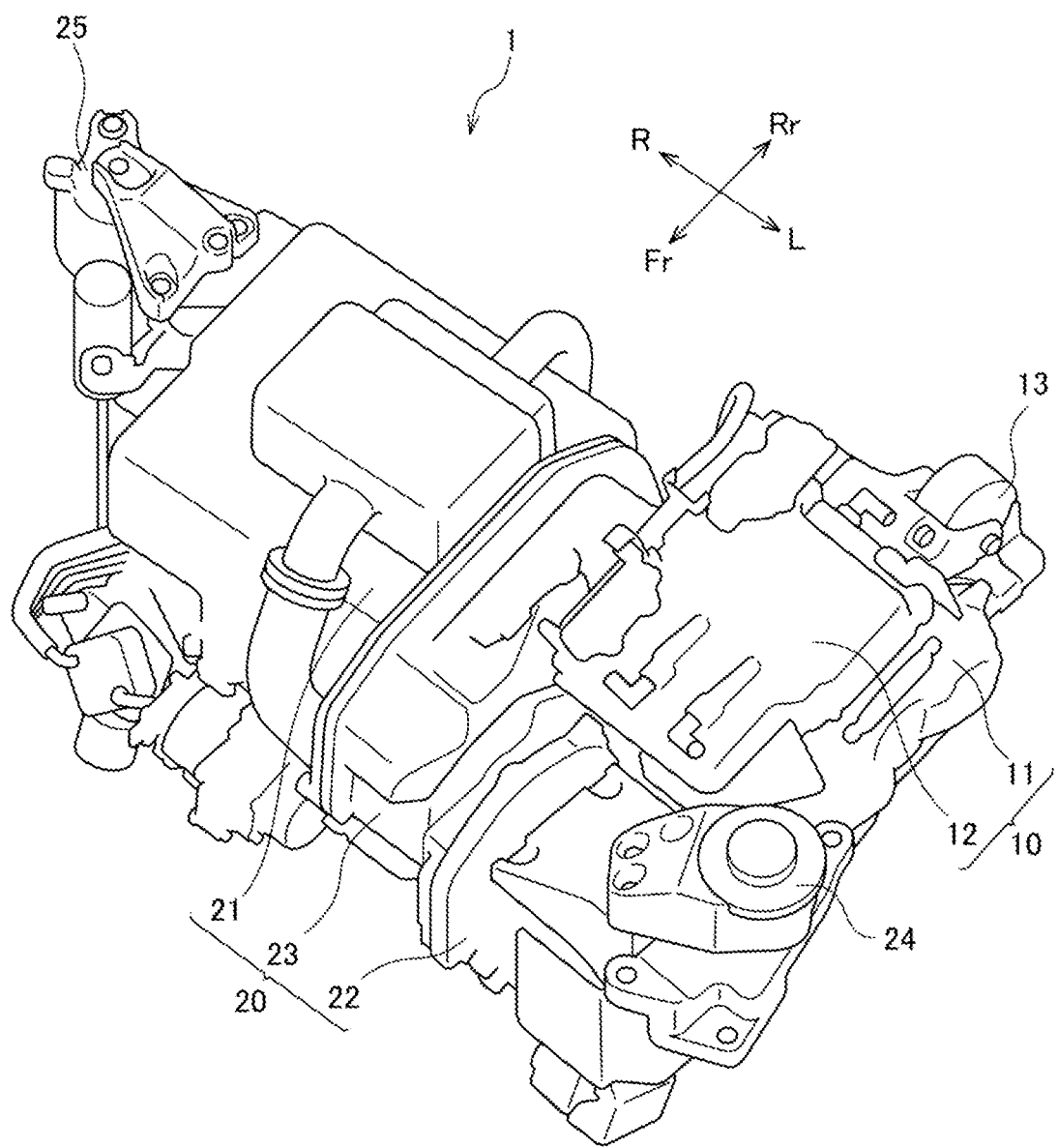
FIG. 2 is another perspective view of the hybrid system.

FIGS. 1 and 2 are perspective views of a hybrid system according to an embodiment of the present invention.

A hybrid system 1 is attached to a vehicle body of a hybrid vehicle and serves as a drive source for the vehicle to travel. FIGS. 1 and 2 are both views of the hybrid system 1 viewed from a front left side, and are perspective views from different angles. In these drawings, a front side (Fr), a rear side (Rr), a right side (R), and a left side (L) are indicated by arrows with respect to a traveling direction of the vehicle. In the following description, front-rear, left-right, and up-down directions are based on the traveling direction of the vehicle.

The hybrid system 1 includes a drive unit 10 provided at the rear side and a power generation unit 20 provided so as to be adjacent to the drive unit 10 in a separated state. The drive unit 10 is provided at the rear side of the power generation unit 20 such that an upper portion thereof is inclined toward the power generation unit 20 at the front side thereof.

The drive unit 10 receives electric power supplied from a battery (not shown) to rotate an axle (not shown). Specifically, the drive unit 10 includes a motor 11 provided with a rotating shaft connected to the axle, and an inverter 12 arranged on an upper portion the motor 11. The inverter 12 converts DC power supplied from the battery into desired AC power and supplies the AC power to the motor 11. The inverter 12 is also connected to the power generation unit 20 as described later. The drive unit 10 may further include a gear train (not shown) connecting the rotating shaft of the motor 11 and the axle.

The drive unit 10 is fixed to a frame member, which is a part of the vehicle body, via first mount members 13 and 14 at a lower portion thereof. Specifically, the drive unit 10 is fixed to the vehicle body by the first mount member 13 from the rear side and by the first mount member 14 from the left side. The drive unit 10 is further fixed to the vehicle body from the right side via a first mount member (not shown). Therefore, the drive unit 10 is fixed to the vehicle body at the lower portion thereof via three first mount members.

The power generation unit 20 supplies generated electric power to the battery and the motor 11 via the inverter 12 of the drive unit 10. The power generation unit 20 includes an engine 21 installed on a right portion thereof and driven by gasoline or the like, a generator 22 installed on a left portion thereof, and a gear train 23 provided between the engine 21 and the generator 22 and connecting the two.

A driving force of the engine 21 is transmitted to the generator 22 via the gear train 23. In this way, the generator 22 generates electric power, and the generated electric power is converted into alternating current in the inverter 12 and then supplied to the battery and the drive unit 10. The power generation unit 20 is fixed to the frame member, which is a part of the vehicle body, via second mount members 24 and 25 at an upper portion thereof. Specifically, the power generation unit 20 is fixed to the vehicle body by the second mount member 24 from the left side and by the second mount member 25 from the right side.

In this way, the inverter 12 is connected to the motor 11 in the drive unit 10 and also to the power generation unit 20. That is, the inverter 12 is configured as a device capable of power conversion between a system that converts electric power stored in the battery from direct current to alternating current and then supplies the alternating current to the motor 11 and a system that converts the electric power generated by the generator 22 from alternating current to direct current and then supplies the direct current to the battery and the motor 11.

FIG. 1 shows shock absorbers 26 and 27 connected to the vehicle body on the left side and the right side of the drive unit 10. In FIG. 2, the shock absorbers 26 and 27 are omitted for readability.

Figure 3:
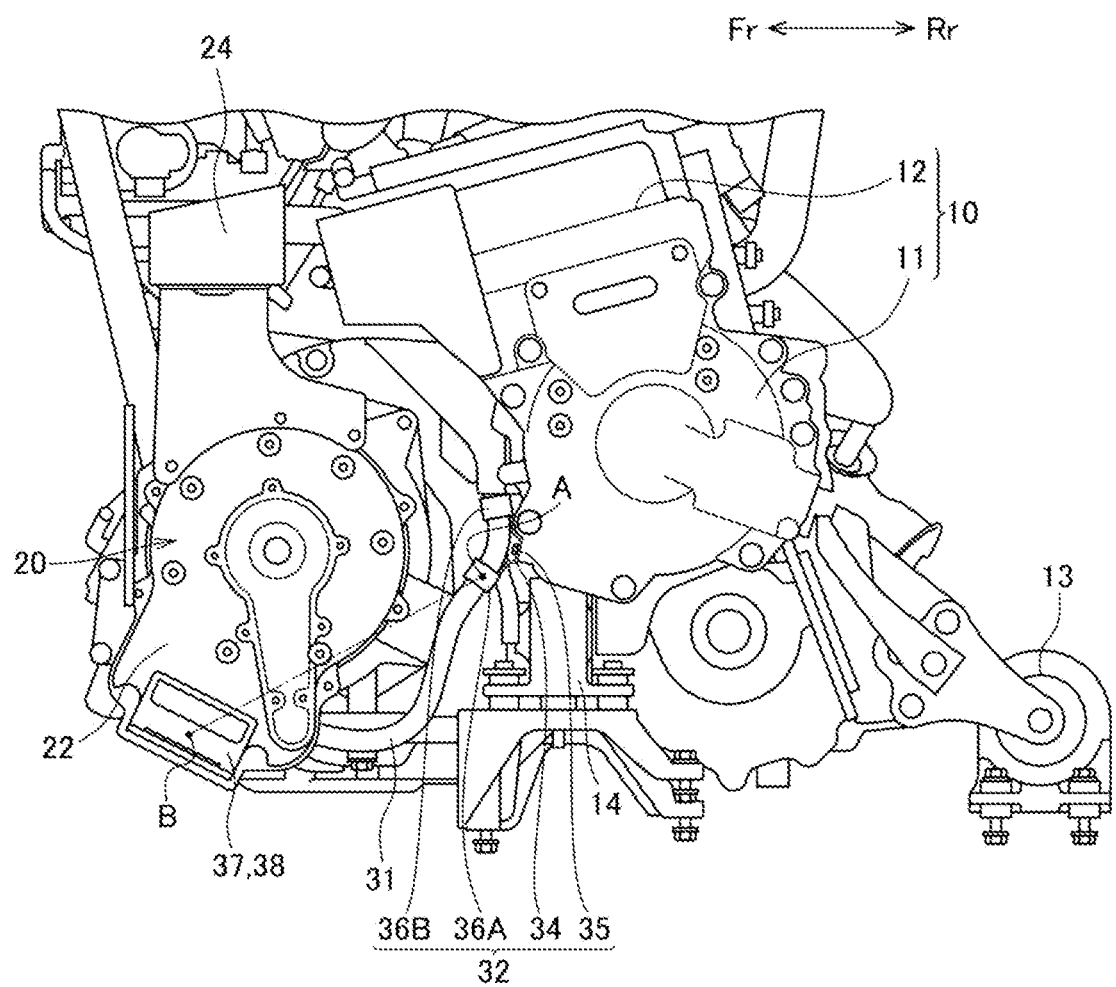
FIG. 3 is a left side view of the hybrid system.

FIG. 3 is a side view of a lower portion of the hybrid system 1 as viewed from the left side.

According to the drawing, the drive unit 10 whose lower portion is fixed by the first mount members 13 and 14 and the power generation unit 20 whose upper portion is fixed by the second mount members 24 and 25 are provided so as to be adjacent to each other in a separated state. That is, the motor 11 of the drive unit 10 and the generator 22 of the power generation unit 20 are arranged so as to be adjacent to each other with a predetermined distance in the front-rear direction.

The drive unit 10 is arranged so that an upper portion thereof is inclined toward the power generation unit 20, and the power generation unit 20 is erected without being inclined. The inverter 12 and the generator 22 are electrically connected to each other via a harness 31. The inverter 12 is also electrically connected to the motor 11 via a harness (not shown). In the present embodiment, the motor 11 and the generator 22 are driven by three phases, and the harness 31 accommodates three cables. The harness 31 is arranged in a gap formed between the drive unit 10 and the power generation unit 20. An intermediate portion in a connection portion between the inverter 12 and the generator 22 is supported by the first support member 32 connected to the motor 11.

Figure 4:
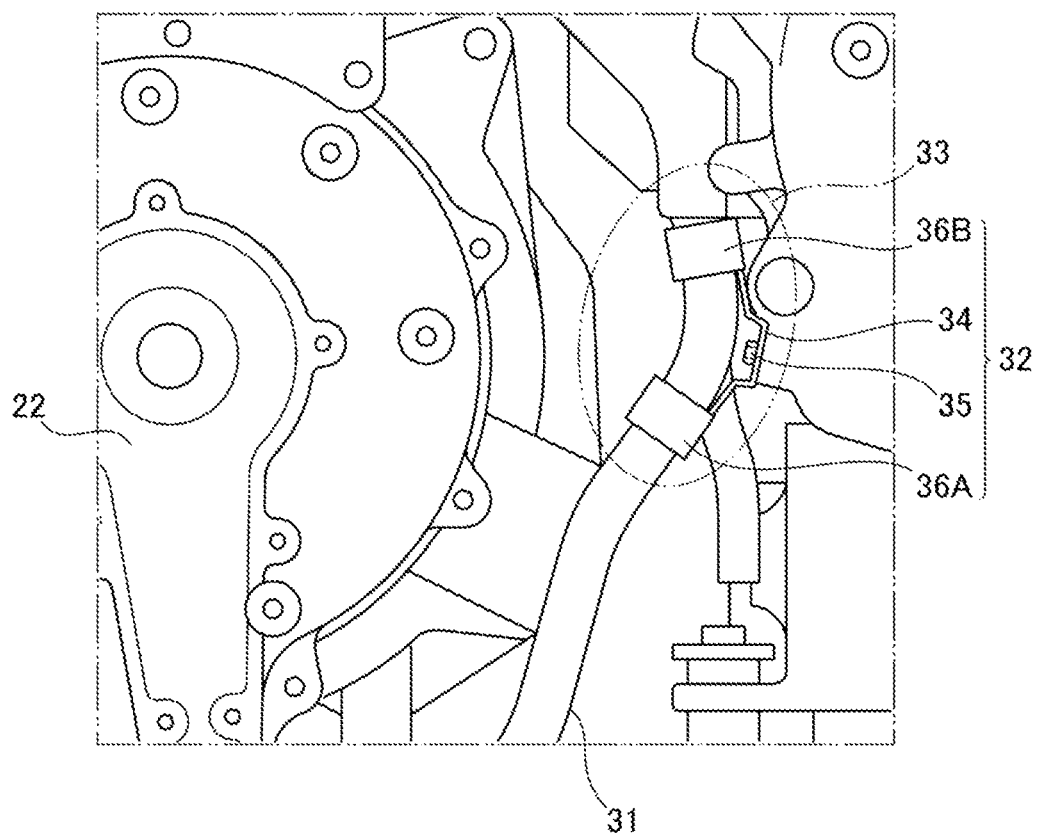
FIG. 4 is an enlarged view of a part of FIG. 3.

FIG. 4 is an enlarged view of a part of FIG. 3. In this drawing, a first support region 33 in which the harness 31 is supported by a first support member 32 is enlarged.

The first support member 32 includes a main body portion 34 which is plate-shaped and includes a plurality of bent portions. The main body portion 34 includes the plurality of bent portions formed along a longitudinal direction, so that a recess is formed in the vicinity of a center in the longitudinal direction. At a place where the drive unit 10 and the power generation unit 20 are closest to each other, the recess of the main body portion 34 is fastened to the motor 11 by a bolt 35. The main body portion 34 is arranged so that the longitudinal direction is perpendicular to a vehicle width direction, and is not inclined in the vehicle width direction.

The first support member 32 further includes first holding members 36A and 36B provided at end portions outside the recess of the main body portion 34, respectively. The first holding member 36A is provided below and the first holding member 36B is provided above a fastening point of the main body portion 34 by the bolt 35. The first holding members 36A and 36B are members formed with an insertion hole into which the harness 31 is inserted, and are configured to be able to hold an outer periphery of the harness 31.

In this way, an intermediate portion of the harness 31 is fixed by the first support member 32 in the first support region 33 including the place where the power generation unit 20 is closest to the drive unit 10. With this configuration, it is possible to reduce a possibility that the harness 31 comes into contact with the generator 22 when the drive unit 10 and the power generation unit 20 swing.

The intermediate portion of the harness 31 is supported by the first holding member 36A below a fastening portion by the bolt 35 of the first support member 32. Here, in a case where the harness 31 is arranged from the lower side to the upper side between the drive unit 10 and the power generation unit 20, the present embodiment will be compared with a comparative example in which the harness 31 is fixed at the fastening portion of the bolt 35.

In the comparative example, the harness 31 is not guided by any member until it is arranged near the fastening portion of the bolt 35. Regarding this point, in the present embodiment, the harness 31 is guided by the first holding member 36A and then arranged in the vicinity of the fastening portion of the bolt 35 having the shortest distance from the power generation unit 20. Therefore, in the present embodiment, the arrangement of the harness 31 can be more easily performed by the guide of the first holding member 36A. In the present embodiment, when the harness 31 is arranged, since the harness 31 is guided by the two first holding members 36A and 36B, which are arranged side by side in the up-down direction, in the first support region 33 where the drive unit 10 and the power generation unit 20 are closest to each other, it becomes easy to arrange the harness 31 above and below the first support region 33.

Next, a portion covered by a left side surface of the generator 22 whose details are not shown in FIG. 3 will be described. At this portion, an intermediate portion (end-side portion) of the harness 31 below the first holding member 36A is fixed to the generator 22 by using the second support member 37. The harness 31 is connected to a connector 38 of the generator 22. In the following, details of a portion covered by the left side surface of the generator 22 and not shown in FIG. 3 will be described with reference to FIG. 5.

Figure 5:
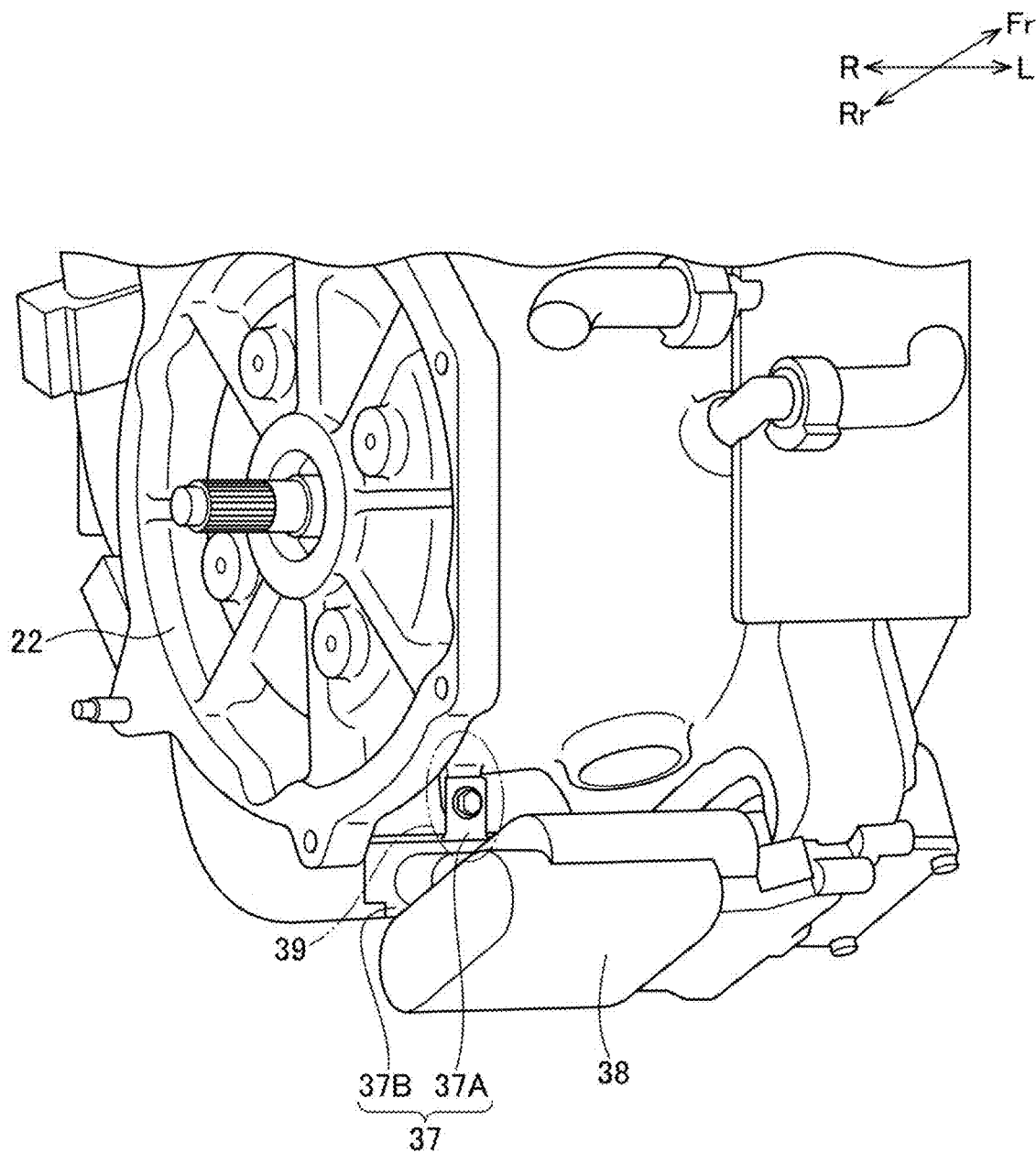
FIG. 5 is an enlarged perspective view of a generator as viewed from a front right side.

FIG. 5 is a perspective view of the generator 22 viewed from a front right side.

An end portion of the harness 31 is connected to the connector 38 of the generator 22, and the intermediate portion (end-side portion) of the harness 31 is supported by the second support member 37 attached to the generator 22. That is, the harness 31 is connected to the connector 38 at the end portion and is supported by the second support member 37 at the intermediate portion in the vicinity of the end portion. The second support member 37 includes a main body portion 37A fixed to a lower portion of the generator 22 and a holding member 37B formed at a lower portion of the main body portion 37A. The holding member 37B is a member formed with an insertion hole into which the harness 31 is inserted, and is configured to be able to hold the outer periphery of the harness 31. A region where the harness 31 is fixed by the second support member 37 is referred to as a second support region 39.

Here, as shown in FIG. 3, the connector 38 is provided on a side of the generator 22 opposite to the drive unit 10. That is, the connector 38 is arranged at a position closer to the front side in the lower portion of the generator 22. The harness 31 is bent so as to draw a large arc and is arranged so as to head toward the inverter 12 at an upper rear side thereof. Therefore, even when the harness 31 is used for connecting the inverter 12 and the generator 22 by utilizing the gap between the drive unit 10 and the power generation unit 20, the harness 31 is less likely to bend, and durability can be improved.

The first support region 33 and the second support region 39 are provided in the same plane perpendicular to the vehicle width direction without any deviation in the vehicle width direction (left-right direction) of the vehicle. Therefore, the harness 31 between the first support region 33 and the second support region 39 is less likely to be deviated in the left-right direction, and is arranged linearly in the up-down direction, so that the harness 31 is avoided from becoming unnecessarily long. Further, if the harness 31 has the same length, and when there is no deviation in the left-right direction between the first support region 33 and the second support region 39, compared with a case where deviation occurs, the harness 31 tends to sag between the first support region 33 and the second support region 39, and an extra length tends to occur.

As shown in FIG. 3, the harness 31 is provided on a radial outer side of the generator 22 with respect to a line connecting the first support region 33 and the second support region 39, for example, a dash line connecting a point A of the first holding member 36A and a point B of the holding member 37B of the second support member 37. In other words, the harness 31 is provided on the radial outer side of the cylindrical generator 22, that is, on an outer diameter side than the housing of the generator 22. With such a configuration, the harness 31 will sag. As a result, when the drive unit 10 and the power generation unit 20 swing in directions away from each other, it is possible to prevent the harness 31 from being pulled between the first support region 33 and the second support region 39.

According to the hybrid system 1 of such an embodiment, the following effects can be obtained.

According to the hybrid system 1 of the present embodiment, the drive unit 10 and the power generation unit 20 are provided separately and adjacent to each other in a separated state. The lower portion of the drive unit 10 is fixed to the vehicle body by the first mount members 13 and 14, and the upper portion of the power generation unit 20 is fixed to the vehicle body by the second mount members 24 and 25.

In such a configuration, an upper portion of a unit fixed by the first mount members 13 and 14 swings around a lower mount position. A lower portion of a unit fixed by the second mount members 24 and 25 swings around an upper mount position.

Therefore, in the hybrid system 1, clearance between the drive unit 10 and the power generation unit 20 can be designed just considering the swing of the unit fixed to the vehicle body by the first mount members 13 and 14 in the upper portion and just considering the swing of the unit fixed to the vehicle body by the second mount members 24 and 25 in the lower portion. By doing so, the clearance can be shortened as compared with a case where the upper portions or the lower portions of both the drive unit 10 and the power generation unit 20 swing and come close to each other, so that the hybrid system 1 can be miniaturized.

A gear train connected to wheels included in the drive unit 10 and the gear train 23 in the power generation unit 20 are housed in different units. Therefore, as compared with a case where both the gear trains are housed in one unit, resonance is reduced by miniaturizing a wall surface of a housing of each unit, so that noise can be reduced.

In the present embodiment, the drive unit 10 is mounted at the lower portion and the power generation unit 20 is mounted at the upper portion, but the present invention is not limited to this. The drive unit 10 may be mounted at the upper portion and the power generation unit 20 may be mounted at the lower portion. That is, one of the drive unit 10 and the power generation unit 20 may be mounted at the lower portion and the other unit may be mounted at the upper portion.

A mount position of the drive unit 10 may be lower than a center of a length in the up-down direction of the drive unit 10, and when a position of a center of gravity of the drive unit 10 is above the center, the mount position may be above the center. Similarly, a mount position of the power generation unit 20 may be above a center of a length in the up-down direction of the power generation unit 20, and when a position of a center of gravity of the power generation unit 20 is lower than the center, the mount position may be lower than the center.

According to the hybrid system 1 of the present embodiment, in the drive unit 10 mounted by the first mount members 13 and 14 at the lower portion, the inverter 12 is arranged at the upper portion of the motor 11.

Here, since the power generation unit 20 includes the engine 21, it is heavier than the drive unit. If, in the power generation unit 20, the upper portion of the power generation unit 20 is mounted by the second mount members 24 and 25 with the inverter 12 arranged on the upper portion of the generator 22, since a swing width of the lower portion of the heavy power generation unit 20 becomes large, it is necessary to increase the separation distance between the drive unit 10 and the power generation unit 20.

With respect to this point, in the present embodiment, in the drive unit 10, the lower portion of the drive unit 10 is mounted by the first mount members 13 and 14 in a state where the inverter 12 is arranged on the upper portion of the motor 11. In such a configuration, since a swing width of the relatively lightweight inverter 12 provided on the upper portion of the light drive unit 10 is small, the separation distance between the motor 11 and the generator 22 can be shortened.

In the power generation unit 20, a configuration is conceivable in which the upper portions of both the inverter 12 and the generator 22 are mounted with the inverter 12 arranged on the upper portion of the generator 22, but such a configuration is not preferable since a configuration of a flow path of a refrigerant for cooling the mount members and the generator 22 becomes complicated. Therefore, when the inverter 12 is provided above the generator 22, the upper portions of both the inverter 12 and the generator 22 cannot be mounted, and only the inverter 12 can be mounted. Therefore, downward swing of the power generation unit 20 becomes large, and thus it is necessary to increase the separation distance between the drive unit 10 and the power generation unit 20. Therefore, in the drive unit 10 mounted at the lower portion, providing the inverter 12 on the upper portion of the motor 11 is a preferable arrangement of the inverter 12 in order to shorten the separation distance between the drive unit 10 and the power generation unit 20.

According to the hybrid system 1 of the present embodiment, the drive unit 10 is fixed to the vehicle body by the first mount member, and the power generation unit 20 is fixed to the vehicle body by the second mount members 24 and 25. The power generation unit 20 is arranged at the front side of the drive unit 10. Therefore, in the drive unit 10 provided at the rear side, by arranging the inverter 12 on the upper portion of the motor 11, a front portion of the vehicle can be designed low, so that a degree of freedom in design can be increased. The inverter 12 is less likely to receive an external impact during frontal collision. Since vibration of the engine 21 is prevented from being directly propagated to the inverter 12, durability of the inverter 12 can be improved.

The hybrid system 1 of the present embodiment further includes the harness 31 arranged between the drive unit 10 and the power generation unit 20, which is a wiring that connects the generator 22 and the inverter 12. The generator 22 includes the connector 38 connected to the harness 31 on an opposite side of the drive unit 10, that is, on a side opposite to the drive unit 10 with respect to a rotor shaft of the generator 22 in the front-rear direction of the vehicle.

The connector 38 to which one end of the harness 31 is connected is provided on a side of the generator 22 opposite to the drive unit 10. As a result, the harness 31 whose other end is connected to the inverter 12 has a large bending radius, and thus tends to have a long total length. As a result, when the drive unit 10 and the power generation unit 20 swing in directions adjacent to each other, since a possibility that the harness 31 is bent is reduced, it becomes easy to secure a strength thereof.

By securing the extra length of the harness 31, when the drive unit 10 and the power generation unit 20 swing in directions close to each other, the harness 31 is prevented from being pulled between the first support region 33 and the second support region 39.

According to the hybrid system 1 of the present embodiment, the drive unit 10 is provided with the first support member 32 for holding the intermediate portion of the harness 31 in the first support region 33, which is a position closest to the power generation unit 20. In this way, since the harness 31 is fixed at the position closest to the power generation unit 20, even if the drive unit 10 and the power generation unit 20 swing, it is possible to reduce a possibility that the harness 31 fixed to the drive unit 10 comes into contact with the power generation unit 20.

According to the hybrid system 1 of the present embodiment, the first support member 32 includes the plate-shaped main body portion 34 that is fastened to the motor 11 by the bolt 35, and the first holding members 36A, 36B provided at end portions of the main body portion 34, respectively.

Particularly, the intermediate portion of the harness 31 is supported by the first holding member 36A below the fastening portion of the main body portion 34 to the motor 11. With such a configuration, compared with a case where the holding member is provided at the fastening portion of the main body portion 34, when arranging the harness 31 between the drive unit 10 and the power generation unit 20, the harness 31 is guided to a place closest to the power generation unit 20 by the first holding member 36A. Therefore, the arrangement of the harness 31 can be performed more easily.

According to the hybrid system 1 of the present embodiment, the intermediate portion of the harness 31 is supported by the second support member 37 fixed in the second support region 39 of the power generation unit 20. The second support region 39 is below the first support member 32. With this configuration, since there are a plurality of positions where the intermediate portion of the harness 31 is supported, it is possible to reduce the possibility that the harness 31 comes into contact with the drive unit 10 and the power generation unit 20.

According to the hybrid system 1 of the present embodiment, the intermediate portions of the harness 31 are supported in the first support region 33 in which the first support member 32 is provided and the second support region 39 in which the second support member 37 is provided. The first support region 33 and the second support region 39 are provided in the same plane perpendicular to the left-right direction.

Therefore, the harness 31 is prevented from becoming unnecessarily long as compared with a case where the first support region 33 and the second support region 39 are not provided in the same plane. Further, if the harness 31 has the same length, and when there is no deviation in the left-right direction between the first support region 33 and the second support region 39, compared with a case where deviation occurs, the extra length of the harness 31 can be made longer, and the harness 31 tends to sag. As a result, when the drive unit 10 and the power generation unit 20 swing, it is possible to prevent the harness 31 from being pulled between the first support region 33 and the second support region 39. When fixing the harness 31, it is not necessary to adjust a position thereof in the left-right direction, so that workability can be improved.

Although the embodiment of the present invention has been described above, the above-mentioned embodiment is merely a part of application examples of the present invention, and does not mean that the technical scope of the present invention is limited to the specific configurations of the above-mentioned embodiment.

The invention claimed is:

1. A hybrid system installed in a vehicle, comprising:
   a drive unit comprising a motor for driving wheels; and
   a power generation unit comprising an engine and a generator configured to be driven by the engine, wherein the power generation unit is adjacent to the drive unit separated from the drive unit, wherein
   one of the drive unit and the power generation unit is mounted on a vehicle body via a first mount member at a lower portion of the one unit such that an upper portion of the one unit is capable of swinging independently from the other one of the drive unit and the power generation unit, and
   the other one of the drive unit and the power generation unit is mounted on the vehicle body via a second mount member at an upper portion of the other one unit such that a lower portion of said other one is capable of swinging independently from the one unit.

2. The hybrid system according to claim 1, further comprising:
   an inverter for controlling the motor and the generator, wherein
   the inverter is arranged above the one unit fixed by the first mount member.

3. The hybrid system according to claim 2, wherein
   the drive unit is mounted on the vehicle body via the first mount member,
   the power generation unit is mounted on the vehicle body via the second mount member, and
   the drive unit is arranged behind the power generation unit in a front-rear direction of the vehicle.

4. The hybrid system according to claim 3, further comprising:
   a harness which is a wiring for connecting the generator and the inverter, and is arranged between the drive unit and the power generation unit, wherein
   the generator includes a connection portion with the harness on an opposite side of the drive unit.

5. The hybrid system according to claim 4, wherein
   the drive unit includes a first support member for supporting an intermediate portion of the harness at a position closest to the power generation unit.

6. The hybrid system according to claim 5, wherein
the first support member includes:
- a main body portion fixed to the drive unit, and
- a holding portion that is attached to the main body portion and holds the harness, and a holding position of the harness by the holding portion is lower than a position where the main body portion is fixed to the drive unit.

7. The hybrid system according to claim 5, wherein
the power generation unit includes a second support member for supporting an intermediate portion of the harness below the first support member.

8. The hybrid system according to claim 7, wherein
when the intermediate portion of the harness supported by the first support member is defined as a first support region, and the intermediate portion of the harness supported by the second support member is defined as a second support region, when viewed from a front-rear direction of the vehicle, the first support region and the second support region are set so as not to deviate in a vehicle width direction of the vehicle.

\* \* \* \* \*